Figure 1:
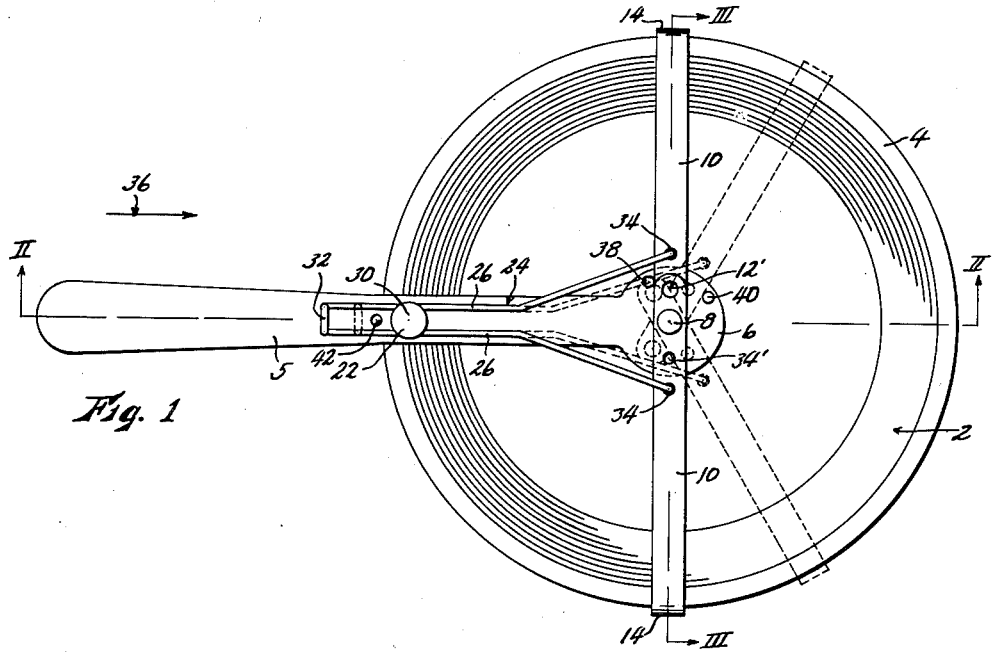

July 3, 1962

L. J. KING 3,042,439

PIE TIN HANDLING DEVICE

Filed Oct. 8, 1959

INVENTOR.
Lowell J. King
BY John A. Hamilton
Attorney.

3,042,439
PIE TIN HANDLING DEVICE
Lowell J. King, 821 W. Lexington, Independence, Mo.
Filed Oct. 8, 1959, Ser. No. 845,158
6 Claims. (Cl. 294—30)

This invention relates to new and useful improvements in devices for lifting and handling pie tins and the like, having particular reference to a device suitable for inserting or removing a pie tin into or from a hot oven or the like. It is, however, equally suitable for handling plates, dishes, other types of pans, etc.

An important object of the present invention is the provision of a handling device of the general character described which is not only capable of lifting the pan or other object, but which also has an interlocking engagement with the pan so as to prevent relative movement therebetween. In this manner the pan may be tilted sharply, or may be moved about rapidly, with no danger of its becoming disengaged from the device. Generally, this object is accomplished by a handling device including a plurality of radially extending arms each having a depending leg at the outer end thereof with an inturned hook at its lower end, said legs being positionable about the periphery of a pie tin or the like, and said hooks engageable with the rim or flange of the pie tin to support the same. One contiguous pair of said arms is movable pivotally from a diametrically opposed inoperative position in which the legs thereof closely span the pan and may be moved horizontally into engagement therewith, to an operative position in which they are disposed angularly at less than 180 degrees relative to each other or to any other arm, whereby said pan cannot pass horizontally between any pair of said legs and is thereby secured in the device.

Another object is the provision of a handling device of the character described in which the parts are so arranged that the weight of the pan or other object held does not tend to move the gripping hooks and arms to inoperative positions. In this manner there is no danger that the pan will be released accidentally, either by failure of any mechanical part urging the hooks to their operative positions, or by failure of the operator to exert unremitting manual pressure to hold the hooks in their operative position.

A further object is the provision of a handling device of the character described which is readily adjustable to engage pie tins or the like of various diameters.

Other objects are simplicity and economy of construction, efficiency and dependability of operation, convenience of usage, and adaptability for handling many objects other than pie tins.

Figure 2:
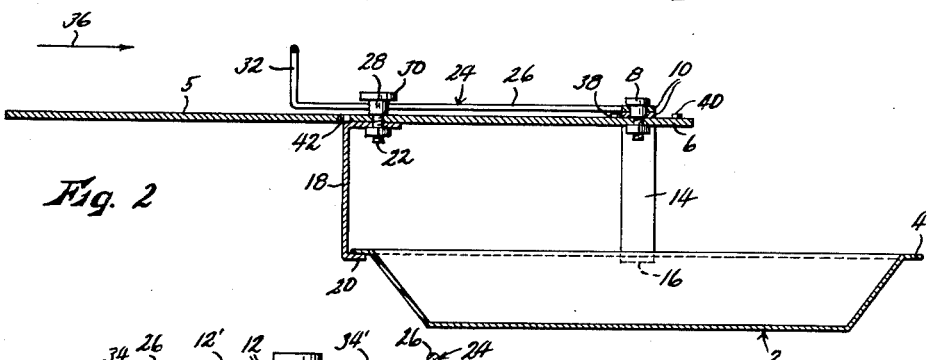
Figure 3:
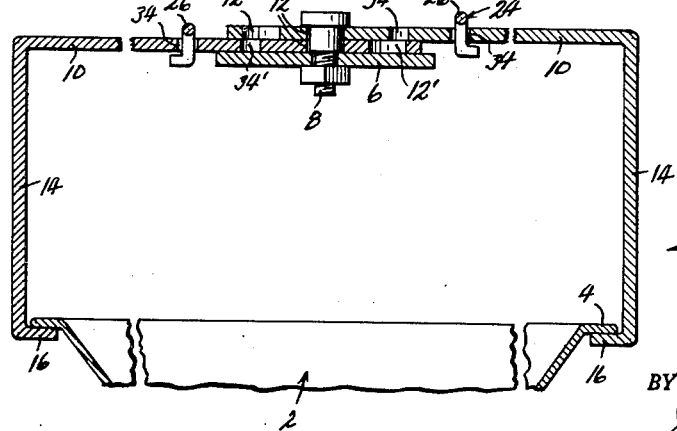

With these objects in view, as well as other objects which will appear in the course of the specification, reference will be had to the drawing, wherein:

FIG. 1 is a top plan view of a pie tin handling device embodying the present invention, in engagement with a pie tin, the movable arms of said handling device being shown in their inoperative positions in solid lines and in their operative positions in dotted lines, FIG. 2 is a sectional view taken on line II—II of FIG. 1, and FIG. 3 is an enlarged fragmentary sectional view, with portions broken away, taken on line III—III of FIG. 1.

Like reference numerals apply to similar parts throughout the several views, and the numeral 2 applies generally to a pie tin of usual configuration, having an outwardly extending flange or rim 4 around its upper edge, and being circular. The lifting and handling device forming the subject matter of the present invention includes an elongated, planar handle 5 formed of sheet metal or other suitable material having an enlarged, circular head 6 at the forward end thereof. Pivoted centrally to said head, by means of a pivot bolt 8, are the inner ends of a pair of radially extending arms 10, said bolt passing through a hole 12 in each of said arms. At its outer end, each of arms 10 is bent to form a depending leg 14, and a short, inwardly turned hook 16 at the lower end of said leg. A third leg 18, having an inturned hook 20 at the lower end thereof, is affixed to handle 5 by means of bolt 22, and is disposed at the same distance from bolt 8 as the legs 14 of pivoted arms 10.

The arms 10 are operated by a handle 24 consisting of a generally U-shaped bend of resilient wire. The opposite reaches 26 extend along handle 5. The rearward portions of said reaches are parallel, and are disposed slidably at either side of an upward extension 28 of said bolt (see FIG. 2), being retained thereon by an enlarged head 30 of said extension. The extreme rearward ends of reaches 26 are bent upwardly to form a finger grip 32. The forward end portions of reaches 26 are divergent and are pivoted respectively to the two arms 10 on axes spaced apart from but parallel to bolt 8. These connections are affected by angling said handle reaches to engage loosely in holes 34 formed in arms 10.

When finger grip 32 is drawn rearwardly as shown in solid lines in FIG. 1, arms 10 extend in diametrically opposite directions so as to be in lineal alignment with each other, and at right angles to handle 5. In this position, the legs 14 of said arms are separated by the full diameter of pan 2, and the device is moved horizontally into engagement with the pan, in the direction of arrows 36. The hooks 16 are thereby engaged under flange 4 at diametrically opposite sides of the pan, and hook 20 engages flange 4 in 90 degree offset relation from hook 16. Finger grip 32 is then pushed forwardly, handle 24 then functioning to pivot arms 10 forwardly to the position shown in dotted lines in FIG. 1, in which said arms are angularly offset from each other, and from handle 5, by about 120 degrees. The distance between any pair of legs 14 and 18 is then less than the diameter of the pie tin, so that said tin cannot pass between any pair of said legs in a horizontal direction, said legs thus acting as a "cage" securely restraining the pie tin against accidental release. The tin may then be handled freely and rather vigorously with no danger that it will be dropped or accidentally released. Moreover the weight of the pie tin and its contents, being supported on hooks 16 and 20, has no tendency to turn or pivot arms 10 back to their inoperative position in alignment, which would of course release the pan. Hence there is no necessity for the operator to grasp finger grip 32 to hold the pan firmly, nor any necessity for mechanical means such as springs or latches to secure the arms in their forward positions. The weight of the pan in no way affects the security with which it is gripped. To release the pan, it is simply rested on a flat surface, and finger grip 32 is pulled rearwardly to return arms 10 to the solid line position shown in FIG. 1. Thereupon the device may be detached from the pan by moving it in a direction opposite to arrows 36.

The movement of arms 10 is limited by a pair of short studs 38 and 40 fixed in head 6 of handle 5 and positioned to engage and limit the movement of one of arms 10 to about 30 degrees. They do not engage the other arm 10, but the movement of said other arm is limited by the fact that it is linked operably to the first arm by handle 24. The movement of the forward ends of handle reaches 26 toward and from each other, as they pivot arms 10 forwardly and rearwardly, is of course accommodated by the resilient yieldability of the handle wire. The vertical length of legs 14 and 18 provides that the device will bridge over a pie in the tin, even though said pie may extend considerably above the top of the tin. The length of said legs is a matter of choice or design, and may vary substantially in devices built for various specific applications. For pie tins, a leg length of 2 inches has been found quite satisfactory.

It will be evident that the device as thus far described is applicable to a pie tin or other object of only one diameter, within a relatively small limit of variation. A slightly larger pan would not pass between legs 14, and a slightly smaller pan would either not be engaged properly by hooks 16, or would pass between the legs even when legs 10 are pivoted forwardly. To extend the usefulness of the device in this respect, each arm 10 is provided with an extra hole 12' for receiving pivot bolt 8, and an extra hole 34' for receiving the associated handle reach 26, holes 12' and 34' being offset longitudinally of the arms from holes 12 and 34 respectively, in a direction such that when bolt 8 is inserted through holes 12' and handle reaches 26 are engaged in holes 34', legs 14 will be disposed at a greater distance apart. Likewise, handle 5 is provided with an extra hole 42 into which bolt 22 may be inserted to position leg 18 at the same distance from bolt 8 as legs 14 when holes 12' are engaged on bolt 8. In this manner the device is adapted to lift and handle objects of a different diameter, for example 10 inch pie tins rather than 9 inch pie tins. Obviously, still further sets of holes 12', 34' and 42 could be provided to give a still greater range of adjustment.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A pie tin handling device comprising an elongated normally horizontal supporting handle, a pair of horizontal arms pivoted coaxially on said handle on a vertical axis and extending radially outwardly therefrom, a depending inwardly directed hook affixed to the outer end of each of said arms, a depending inwardly directed hook affixed to said handle at the same distance from said arm pivot as the hooks affixed to said arms, and operating means constituting an elongated member movably attached to said handle and extending longitudinally therealong, said member being connected at one end to each of said arms and being operable from a point on said handle remotely spaced from said arm pivot to rotate said arms about said arm pivot.

2. A pie tin handling device as recited in claim 1 wherein said operating means interconnects said arms for simultaneous movement between inoperative positions in lineal alignment with each other at right angles to said handle, and operative positions in forwardly divergent relation.

3. A pie tin handling device as recited in claim 2 wherein said arms in their operative position are disposed at approximately 120 degrees angle to each other and to said handle.

4. A pie tin handling device as recited in claim 2 wherein said arms in their operative position are disposed at approximately 120 degrees angle to each other and to said handle, and with the addition of means limiting the movement of said arms to travel between said inoperative and operative positions.

5. A pie tin handling device as recited in claim 1 wherein the effective lengths of said arms are adjustable, and wherein the said hook carried by said handle is adjustable longitudinally of said handle, whereby said device is adapted to handle pie tins of various diameters.

6. A pie tin handling device as recited in claim 5 wherein said member constituting said operating means comprises an operating handle carried for movement longitudinally of said supporting handle, said operating handle including a pair of forwardly projecting, transversely resilient members, the forward ends of said members being pivoted respectively to said arms on axes parallel to but offset transversely from the axis of said arm pivot.

References Cited in the file of this patent

UNITED STATES PATENTS

| | | |
|---|---|---|
| 1,299,797 | Singleton | Apr. 8, 1919 |
| 1,346,820 | Garison | July 20, 1920 |
| 1,779,394 | Grubbs | Oct. 21, 1930 |
| 2,398,129 | Bailey | Apr. 9, 1946 |
| 2,536,246 | Wendt | Jan. 2, 1951 |
| 2,786,708 | Poggio | Mar. 26, 1957 |

FOREIGN PATENTS

| | | |
|---|---|---|
| 141,075 | Germany | May 8, 1903 |